United States Patent Office

3,424,593
Patented Jan. 28, 1969

3,424,593
METHOD OF PRODUCING MODIFIED
ALLIUM CONDIMENTS
Carl Bockman, 6909 Minstrel Ave., and Ronald S.
Nelson, 7460 Capistrano Ave., both of Canoga
Park, Calif. 91304, and Walter A. Klein, 5119 N.
Saddle Rock Lane, Phoenix, Ariz. 85018
No Drawing. Filed Feb. 26, 1965, Ser. No. 435,681
U.S. Cl. 99—154                                    13 Claims
Int. Cl. A23l 1/22, 1/26

ABSTRACT OF THE DISCLOSURE

Treating plants of the allium family, i.e., garlic, onion, leek, to effect a controlled formation of the constituent allicin formed from alliin by the enzymatic action of alliinase by macerating said plants in the presence of citrus juice.

---

The present invention relates generally to condiments, and more particularly relates to a method of producing certain condiment extracts which do not deteriorate to produce undesirable odors, flavors, or systemic reactions when consumed.

More particularly, this invention relates to the extraction and modification of the enzymatically produced characteristic flavoring components of the allium, or bulb plants of the lily family, such as garlic, onion, leek, and the like.

As is well known the characteristic flavor and aroma derived from the allium plants is due to the reaction of an amino-acid substrate with an enzyme to produce a number of compounds which are considered to be typical flavoring constituents of the allium plants.

Some work has been done with the allium plants in an attempt to preserve the characteristic flavors which result from the reaction of the colorless, odorless, amino-acid substrate alliin and its derivatives contained in one portion of the uninjured allium plant with the enzyme alliinase which is contained in another portion of the uninjured allium plant. The enzyme alliinase is believed to be unique to the allium genera of plants. When the cells of the allium plant are injured the enzyme alliinase comes into contact with the substrate alliin to produce a sulfur containing compound allicin and its derivatives. Allicin is the antibacterial substance of garlic (allium sativum) and is also responsible for the typical odor of fresh garlic. The allicin however is normally unstable and rapidly breaks down into the strong smelling and bitter tasting compounds often associated with the use of garlic as a condiment.

Some work has also been done to devise methods of inhibiting the reaction of the substrate alliin with the enzyme alliinase so that only a limited amount of allicin would be produced prior to the actual consumption of the garlic condiment to thereby enhance the use of garlic in prepared foods such as salad dressings, or the like. While the inhibition of the reaction may be considered satisfactory with regard to stabilizing the garlic condiment flavor during the storage of the prepared foods in which the condiment is incorporated, it is almost totally ineffective in preventing the breakdown of the allicin into undesirable compounds, such as sulfides, subsequent to the consumption of the food with the garlic condiment contained therein.

Accordingly, a need exists for a method of treating garlic and other allium plants to preclude the production of undesirable flavors and odors upon consumption of the plant thereby greatly enhancing the utility of the garlic or the like as a condiment.

Briefly this invention provides a method for the treatment of one or more forms of the allium genera of plants to control the reaction of the water soluble amino-acid known as alliin with the enzyme alliinase to produce the desirable flavoring constituent allicin while precluding the breakdown of the allicin to produce the strong-smelling, bitter and otherwise undesirable constituents often associated with the use of allium plants as condiments.

The main object of this invention is, therefore, the provision of a method of substantially controlling the reaction which produces the characteristic flavors, and odors associated with condiments produced from allium plants to preclude the production of highly undesirable odors, flavors, and the occurrence of gastronomic disturbances which have heretofore been associated with the consumption of condiments produced from the allium plants.

Another object of this invention is to provide a method of greatly enhancing the utility of garlic, and the like, as a condiment by rendering the allium condiments more palatable.

In the practice of our invention a condiment extract, or the like is produced from a vegetable, or vegetables of the allium genera such as garlic, onion, leek, and the like, which vegetables acquire their characteristic flavor through the action of an enzyme upon a self-contained substrate, is macerated under such conditions that a controlled reaction occurs between the enzyme and the substrate. This controlled reaction produces an end product which contains all the desirable flavoring and aromatic compounds obtainable from the vegetable while substantially precluding the breakdown of the desirable flavoring constituents into undesirable compounds.

For purposes of illustration only our method will be primarily discussed with regard to garlic, although it will be understood that our method is also suitable for processing of other allium plants such as onion, leek, and the like to produce highly desirable condiments.

Briefly in the practice of our invention an aqueous mixture of lemon juices or other citrus juices, such as orange, lime, grapefruit, tangerine, etc., and other water soluble condiment constituents are vigorously mixed. Olive or other suitable vegetable oil is added to the aqueous mixture and the mixing continued to produce an emulsion. Substantially uninjured garlic cloves or other forms of garlic such as freeze dried garlic for example in which the substrate and the enzyme are still substantially intact are introduced into the oil-water emulsion and blended or macerated into small particles of approximately 0.01 inches in diameter, while in the presence of the emulsion.

While we are not attempting to be restricted by this analysis it is believed that the lemon juice provides a buffering effect which permits reaction of the substrate alliin with the enzyme alliinase to produce the sulfur containing compound allicin while precluding the production of any undesirable sulfides, etc., from the breakdown of the allicin. The stabilized garlic extract produced by this method can then be utilized for the formulation of a variety of foods and condiments. The basic stabilized garlic condiment may be incorporated in such formulations as salad dressings, marinading sauces, meat emulsion products, process and natural cheeses, baked goods, etc.

As stated supra we are aware that work had been done to devise methods of inhibiting the reaction of the substrate allium with the enzyme alliinase so that only a limited amount of allicin would be produced prior to the actual consumption of the garlic condiment. Accordingly, we prepared allium condiments in accordance with the teaching of U.S. Patent No. 2,760,869 to Yanick who teaches the use of oil to effectively separate the substrate and enzyme in the garlic thereby temporarily precluding the interreaction of the substrate allium and the enzyme alliinase during storage of the food product in which the garlic condiment is incorporated. As anticipated, the garlic condiment prepared in accordance with Yanick inhibited the enzymatic reaction between the substrate and the enzyme prior to the consumption of the food. However, upon consumption of the garlic condiment the undesirable after effects of the breakdown of the flavoring constituents of the garlic are realized as a consequence of the enzymatic reaction being reactivated in the aqueous environment of the mouth and digestive tract. This further points up to the fact that our method of treating the allium plants actually brings about the chemical modification of the flavoring constituents of the allium plants treated to preclude the production of undesirable sulfides, ammonia, etc., and is not merely the inhibition or temporary prevention of the enzymatic reaction, between the substrate and the enzyme, until such time as the allium extract is consumed, such as is the case with the product of Yanick.

EXAMPLE I

A specific example of a basic condiment which is utilized as a base for salad dressing, marinading sauce, etc., is produced by blending two fluid ounces of reconstituted natural strength lemon juice, one fluid ounce of water, 1.4 ounces of cane sugar and .45 gram of sodium benzoate in a suitable blending device. For a relatively small volume, such as set forth above, a Waring blender which both blends and macerates is quite suitable. The aqueous phase of our condiment which includes the lemon juice is then mixed with the blender on high speed for approximately one minute. When the aqueous phase has been mixed sufficiently 3 fluid ounces of olive oil are added to the blended aqueous phase and the blending continued at a high speed for approximately one minute longer, or until such time as a well dispersed oil-in-water emulsion is achieved. While maintaining the oil-in-water dispersion approximately 3 cloves of garlic, or other forms of garlic such as freeze dried garlic, for example, in which the substrate and the enzyme are still substantially intact, are introduced into the blender. The blender consequently macerates the garlic in the presence of the oil and water emulsion. The macerating is continued at a low speed until such time as the garlic is macerated into relatively small pieces of approximately .01 inch.

Organoleptic testing of the condiment produced in accordance with Example I by means of tasting, checking for body odors, etc., resulted in a condiment which was characterized by a pleasant garlic flavor and was substantially free of any undesirable odors and from producing any undesirable after tastes, after breath odor of garlic, body odor of garlic or systemic disturbances such as might be caused by the breakdown of the allicin were the garlic not treated in accordance with the method of our invention. The basic condiment as set forth in Example I, with or without the oil, is suitable for use in various foodstuffs such as cheese, meat emulsions, etc.

To further point up the merits of our method of producing garlic condiments, or other allium plant condiments, a series of comparative tests were run utilizing the condiments prepared in accordance with Example I as the control.

Comparative Test 1

A condiment was prepared as set forth in Example I with the exception that the lemon juice was replaced with water. The condiment was quite unpalatable and was characterized by the presence of undesirable bitter sharp garlic flavors due to the breakdown of the allicin and a rather oily taste.

Comparative Test 2

A condiment was produced in accordance with Example I with the exception that the lemon juice and water were eliminated. The resulting condiment was characterized by very undesirable bitter sharp, garlic flavors due to the breakdown of the allicin.

EXAMPLE II

A condiment was prepared in accordance with Example I with the exception that the lemon juice was replaced with either orange, tangerine, tangelo or grapefruit juice. The resulting condiment was almost as palatable as the control however the more dilute nature of the active constituents of the above juices, as compared to lemon juice would apparently require the addition of more of the above juices so as to provide more active constituents, to react with the garlic, as in the control.

EXAMPLE III

A condiment was prepared in accordance with Example I with the exception that the olive oil was eliminated. The resulting product although not palatable as a salad dressing for example contained no significant amount of undesirable flavors, etc., and is suitable for use in flavoring various other foodstuffs.

EXAMPLE IV

An onion condiment was produced in a manner similar to the manner set forth in Example I with the exception that the garlic was replaced with raw onion. The resulting condiment was very palatable and was not characterized by any undesirable sharp or bitter, onion flavors or odors.

EXAMPLE V

A salad dressing was produced in accordance with the method of this invention and includes the following:

4 fluid ounces of reconstituted natural strength lemon juice
2 fluid ounces of water
4 ounces of sucrose
3 grams of mixed salad herbs (parsley, tarragon, pepper, etc.)
0.5 ounce of sodium chloride
1.25 teaspoons of "Fruit Saver" (ascorbic acid antioxidant)
0.7 gram sodium benzoate (bacteriostatic)
0.125 ounce of monosodium glutamate The above aqueous phase was mixed in a Waring blender operating at high speed for approximately 70 seconds. Six fluid ounces of olive oil were added to the aqueous phase and the mixing continued at high speed for approximately 60 seconds, to produce an oil-water emulsion. 0.75 ounce of raw garlic cloves or the like, where introduced into the blender and macerated for approximately 30 seconds to reduce the garlic cloves to particle size of approximately 0.01 inch. An organoleptic test of the salad dressing showed that the dressing was highly palatable and was characterized by a very pleasant garlic flavor. Subsequent to consumption of the salad dressing the persons testing the dressing were not subjected to any undesirable systemic reactions or side effects such as bad breath, body odors, or gastric disturbances such as would occur with the consumption of garlic, or other allium products, which have not been treated by the method of our invention. A quantitative chemical analysis of the salad dressing indicated a pH of about 3.7, an ammonia content of .007% and a free sulfur content of .025%.

As stated supra the basic method of our invention involves the macerating of the garlic, or other allium plants, in the presence of a citrus or lemon juice until the garlic is reduced to a relatively small particle size. Additionally, a suitable vegetable oil such as olive oil, or peanut oil, or combination thereof, may also be incorporated to increase the palatability of certain of the condiments however they do not appear to enter into the chemical reaction which substantially precludes the production of undesirable breakdown products such as sulfides and ammonia, as is further evidenced by the comparative tests described.

EXAMPLE VI

Accordingly, the basic condiment set forth in Example I may be varied to produce other foodstuffs such as a garlic based marinading sauce for meat. A garlic based marinading sauce for meat would be produced as follows:

15 ounces of reconstituted natural strength lemon juice
1 ounce of sodium chloride
8 ounces of olive oil
2 grams of mixed salad herbs (parsley, tarragon, pepper, etc.) would be thoroughly blended in a suitable blender such as a Waring blender, for example
6 ounces of raw garlic would be macerated in the presence of lemon juice, olive oil emulsion to a particle size of approximately 0.01 inch.

The use of a marinading sauce produced in this manner imparts a pleasant garlic flavor and odor to the meat without subjecting the persons consuming the meat to undesirable flavors or systemic reactions such as would be the result of utilizing garlic which had not been treated in accordance with our invention.

It will be seen from the foregoing description and specific examples of the practice of our invention that the reaction of the substrate and the enzyme contained in the allium plants is not merely inhibited or prevented, but is allowed to proceed in a controlled manner to produce the highly desirable flavoring constituents characteristic of the allium plants while substantially precluding the production of undesirable flavoring constituents, or the breakdown of the desirable flavoring constituents into highly undesirable bitter, sharp, odoriferous end products such as sulfides, ammonia, or the like, which produce highly undesirable systemic side effects in the person consuming allium condiments which have not been produced in accordance with the method of our invention.

What is claimed as new is as follows:

1. The method of stabilizing the flavor constituent of a condiment produced from plants of the allium genera which derive their characteristic flavor through enzymatic action between an enzyme and a substrate naturally occurring in the plant to improve the flavor of the condiment by substantially precluding the production of undesirable constituents, from the enzymatic breakdown of said substrate, said method comprising the steps of controlling the reaction of the enzyme with the substrate by macerating said plants in the presence of citrus juice.

2. The method of stabilizing an enzymatically produced constituent produced through enzymatic action between an enzyme and a substrate naturally occurring in a plant of the allium genera by substantially precluding the production of undesirable constituents from the enzymatic breakdown of said substrate, said method comprising the steps of controlling the reaction of the enzyme with the substrate by macerating said plant in the presence of lemon juice.

3. The method of stabilizing the flavor constituent of a condiment produced from a fruit of the allium genera which derives its characteristic flavor through said flavor constituent being formed by enzymatic action between an enzyme and a substrate naturally occurring in the fruit by substantially precluding the production of undesirable constituents from the enzymatic breakdown of said substrate of fruit selected from the group consisting of garlic, onion and leek, said method comprising the steps of controlling the reaction of the enzyme with the substrate by macerating said fruit in the presence of a citrus juice selected from the group consisting of lemon juice and orange juice.

4. The method of stabilizing the flavor constituent of a condiment produced from a fruit of the allium genera which derives its characteristic flavor through said flavor constituent being formed by enzymatic action between an enzyme and a substrate naturally occurring in the fruit by substantially precluding the production of undesirable constituents from the enzymatic breakdown of said substrate, said method comprising the steps of controlling the reaction of the enzyme with the substrate by macerating said fruit in the presence of a fluid medium which includes a vegetable oil and a citrus juice.

5. The method of stabilizing the flavor constituents of a condiment produced from a fruit of the allium genera which derives its characteristic flavor through said flavor constituent being formed by enzymatic action between an enzyme and a substrate naturally occurring in the fruit by substantially precluding the production of undesirable constituents from the enzymatic breakdown of said substrate, said method comprising the steps of controlling the reaction of the enzyme with the substrate by macerating said fruit in the presence of a fluid medium containing an oil selected from the group consisting of olive and peanut oil and a citrus juice selected from the group consisting of lemon, orange, tangerine, tangelo and grapefruit juice.

6. The method of reacting the flavor precursor substrates of the allium plants with their self-contained enzymes in a controlled manner by macerating said plants in the presence of citrus juice, said method substantially precluding the production of any significant amount of undesirable constituents thereby greatly enhancing the utility of the allium plants for utilization as condiments.

7. The method according to claim 3 where the fruit is garlic.

8. The method according to claim 3 where the fruit is onion.

9. The method according to claim 3 wherein the fruit is leek.

10. The method of stabilizing the flavor constituent of a condiment produced from a fruit of the allium genera which derives its characteristic flavor through said flavor constituent being formed by enzymatic action between an enzyme and a substrate naturally occurring in the fruit by substantially precluding the production of undesirable constituents from the enzymatic breakdown of said substrate, said method comprising the steps of controlling the reaction of the enzyme with the substrate by macerating about ⅔ oz. avoir. of said fruit in the presence of about 2 fluid oz. natural strength lemon juice.

11. The product produced by the method of claim 1.

12. The method according to claim 1 where the allium fruit is selected from the group consisting of garlic, onion and leek in which the self-contained substrate and enzyme are preserved substantially intact within them.

13. The method of preserving the antibacterial allicin constituent of garlic, said method comprising the steps of controlling the action of the enzyme alliinase on the substrate alliin by macerating said fruit in the presence of citrus juice whereby the production of undesirable flavors from the enzymatic breakdown of allicin is precluded.

References Cited

UNITED STATES PATENTS 2,760,869   8/1956   Yanick _____ 99—140

FOREIGN PATENTS 978,747   12/1964   Great Britain.
1,178,685   9/1964   Germany.

A. LOUIS MONACELL, *Primary Examiner.*

J. M. HUNTER, *Assistant Examiner.*

U.S. Cl. X.R.

99—140